United States Patent
Koch

[15] 3,697,840
[45] Oct. 10, 1972

[54] CONTROLLER FOR VARIABLE RELUCTANCE MOTOR

[72] Inventor: Wolf H. Koch, Bloomfield Hills, Mich.

[73] Assignee: Ford Motor Company, Dearborn, Mich.

[22] Filed: March 8, 1971

[21] Appl. No.: 121,656

[52] U.S. Cl. .................. 318/138, 318/166, 318/254
[51] Int. Cl. ............................................. H02k 29/00
[58] Field of Search......318/138, 166, 254, 686, 695; 321/45 C

[56] References Cited

UNITED STATES PATENTS

| | | | |
|---|---|---|---|
| 3,307,091 | 2/1967 | Johannes | 318/138 |
| 3,348,109 | 10/1967 | Wright | 318/138 |
| 3,486,096 | 12/1969 | Van Cleave | 318/696 |
| 3,560,818 | 2/1971 | Amato | 318/138 |
| 3,560,821 | 2/1971 | Beling | 318/138 |

*Primary Examiner*—Gene Z. Rubinson
*Attorney*—John R. Faulkner and Robert W. Brown

[57] ABSTRACT

Described is a control circuit for the application of direct current electrical energy to the winding of a variable reluctance motor. Brushless operation of the variable reluctance motor is achieved with a primary solid state switching device connected in series with the motor winding and with a secondary solid state switching device connected in parallel with the motor winding. Commutation means for the primary solid state switching device are provided and a rectifier returns energy from the winding to the direct current source. Several possible circuit configurations for the commutation means are described. The control circuit may be used to provide rapid rise of motor winding ampere-turns, maintenance thereof at a high level, and rapid decline thereof with efficient return of magnetic energy to the DC source.

28 Claims, 9 Drawing Figures

FIG. 1

INVENTOR
WOLF H. KOCH

INVENTOR
WOLF H. KOCH
BY John R. Faulkner
Robert W. Brown
ATTORNEYS

CONTROLLER FOR VARIABLE RELUCTANCE MOTOR

BACKGROUND OF THE INVENTION

This invention relates to a motor controller. More particularly, it relates to a control circuit to supply direct current electrical energy to a variable reluctance motor.

The term "variable reluctance motor" as used herein refers to a machine, actuator, or electromechanical transducer which employs a magnetic circuit, in association with one or more exciting windings, and a ferromagnetic armature or rotor and which generates mechanical torque or force which is substantially proportional to the square of the winding ampereturns and to the time rate of change of permeance (reciprocal of reluctance) as a function of the displacement of the armature or rotor. Typically, these motors employ a stator containing a single motor winding for each phase and a rotor containing ferromagnetic material. Displacement of the rotor relative to this stator produces a variation in reluctance, and hence permeance, of the magnetic circuit enclosed by the motor winding.

The torque or force produced by such a variable reluctance motor is proportional to the product of the square of the winding ampere-turns and the rate of change of permeance as a function of rotor displacement. From the preceding, it is apparent that motor torque or force that is positive with respect to some arbitrary reference can only be developed when winding ampere-turns are sustained during an interval in which the permeance increases with rotor displacement. Conversely, negative motor torque or force is developed when winding ampere-turns are sustained during an interval in which the permeance decreases with rotor displacement. Thus, in order to secure continuous rotation of the variable reluctance machine, it is necessary to apply ampere-turns to the magnetic circuit during intervals of increasing permeance and to decrease or eliminate such ampere-turns during intervals of decreasing permeance. The application of ampereturns during intervals of decreasing permeance results in a braking action.

From the above discussion, it may be seen that it is desirable to supply winding current to the motor during intervals in which the permeance increases with displacement and to interrupt this current during intervals in which the permeance is decreasing with displacement. Hence, operation of a variable reluctance motor requires a controller capable of supplying and interrupting current into the motor winding at the appropriate rotor positions. Since the developed torque is proportional to the square of the ampere-turns and is, therefore, independent of the instantaneous direction of current, the controller in principle may supply direct current, alternating current, or a combination of both.

SUMMARY OF THE INVENTION

The controller of the invention couples a direct current source of electrical energy to a variable reluctance motor to provide a high degree of electrical efficiency without the use of brushes. Winding current is shaped to approach a desired waveform, and speed control may be achieved, when the control circuit of the invention is used in conjunction with appropriate logic circuitry designed to accomplish a desired end result.

The controller of the invention uses solid state switching devices and a rectifying device in conjunction with commutating means for the solid state switching devices to couple a DC source of electrical energy to a variable reluctance motor. More specifically, the control circuit includes a motor winding having a primary solid state switching device connected in series therewith. One terminal of the DC source of electrical energy is connected to the primary solid state switching device, and a second terminal of the source is connected to the motor winding at or about its midpoint. A secondary solid state switching device is connected in parallel with at least a portion of the motor winding and in series with the primary solid state switching device. A rectifying device, such as a diode, is connected between one of the battery terminals and a point located along, or at one end of, the motor winding. In addition, circuit means for commutating the primary solid state switching device, that is, for changing it from a conductive to a nonconductive state, are provided.

The use of the secondary solid state switching device described above and hereinafter and of the connection of the second terminal of the DC source to the motor winding at or about its midpoint are particularly desirable features of the invention. These features make it possible not only to withdraw energy from the DC source during the process of energizing a first portion of the motor winding and to return energy thereto during the process of de-energizing the motor winding, but also to utilize an additional portion of the motor winding for providing magnetic excitation of the air gaps between motor stator and rotor poles during a major portion of the torque-producing interval.

A disc-type variable reluctance motor preferably is used with the controller of this invention. Smooth torque generation is provided by using multiple phases, preferably three or more. Each phase comprises a toroidal winding that surrounds a stationary stator disc having pie-shaped sections of laminated steel spaced by minimum permeance sections usually made of aluminum or reinforced polymeric materials. A rotor disc of similar construction is mounted on each side of the stator disc. The periphery of each rotor is wound with a thin layer of a high strength, low permeance material, such as fiberglass, to increase the maximum potential rotor speed.

In addition to the controller of the invention, the operation of the variable reluctance motor requires the use of logic circuitry. The logic circuitry performs the function of gating or otherwise controlling the operation of the various solid state switching devices included in the controller circuit. The specific design of such logic circuitry depends upon the desired mode or modes of operation of the controller circuitry in view of reluctance motor performance requirements and, therefore, does not constitute a part of this invention. Moreover, the design of logic circuitry to provide a sequence of gating pulses or the like sufficient to operate the controller circuitry of the invention is within the skill of the art.

In association with the logic circuitry, a position sensor may be connected to the motor shaft. The position sensor may be used to indicate the onset and termination of an interval of increasing magnetic permeance. It may, for example, comprise a disc rotatably attached to the motor shaft, the disc having apertures therein indicative of rotor position which sequentially become aligned with sensing devices, such as light-activated silicon-controlled rectifiers, to cause voltage pulses to be produced indicative of such alignment. Such a voltage pulse from the position sensor would be fed to the logic circuitry to cause it to produce the sequence of pulses that would gate or switch the solid state switching devices of the controller, thereby, to apply DC electrical energy to the motor winding. As is the case with the logic circuitry, the position sensor is not considered to be a part of the present invention. However, suitable position sensing apparatus for a reluctance motor is described in U.S. Pat. application Ser. No. 121,655 filed Mar. 8, 1971, in the name of Douglas R. Hamburg and assigned to the Ford Motor Company.

The controller circuit of this invention is particularly useful in an electrically powered vehicle where the motor is connected to drive a vehicle wheel. High torque is generated at low speeds by the idealized wave shape which may be produced by the controller circuitry, and the return of magnetic energy from the winding to the DC source of electrical energy contributes significantly to the overall motor efficiency. Moreover, vehicle braking similar to the braking generated by an internal combustion engine can be provided and the energy generated during vehicle braking applied to the battery without additional controller circuit components.

DETAILED DESCRIPTION OF THE INVENTION

Figure 1:
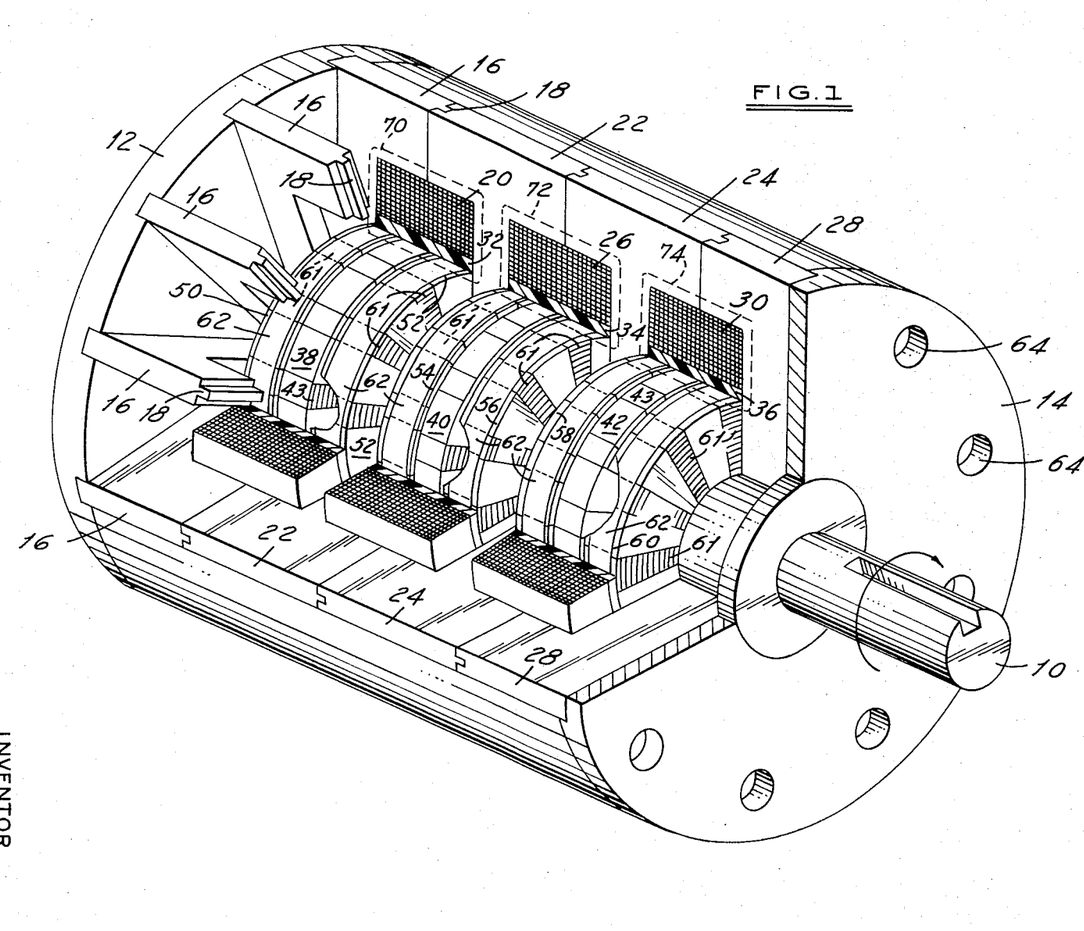
FIG. 1 is a sectional perspective drawing illustrating the construction of a three phase disc-type variable reluctance motor capable of using the controller circuit of the present invention.

FIG. 1 is a sectional view of a disc-type variable reluctance motor. The description of this motor is necessary to facilitate a complete understanding of the controller circuitry of the invention.

With reference now to FIG. 1, a motor shaft 10 is mounted rotatably in two end plates 12 and 14. A plurality of L-shaped members 16 have their longer legs positioned in shallow grooves on the interface of end plate 12. The shorter legs of members 16 project axially inward with the outer surfaces thereof at the approximate level of the outer periphery of end plate 12. Members 16 are made of laminated steel with the laminations running parallel to the shaft axis and have small radially directed tongues 18 at the inner surfaces of the shorter legs.

A helically-wound, toroidally-shaped first phase winding 20 has one-half of its width fitting into the steps of L-shaped members 16 and is held in place by a plurality of T-shaped members 22. Members 22 have a groove cooperating with tongue 18. Similar T-shaped members 24 hold the winding 26 of the second phase in place against members 22, and L-shaped members 28 cooperate with T-shaped members 24 to hold the winding 30 of the third phase in place. Members 22, 24, and 28 also are made of laminated steel.

Rims 32, 34, and 36 of fiberglass are positioned against the radially interior surfaces of respective windings 20, 26, and 30 and are connected to the outer peripheries of respective stator discs 38, 40, and 42. Each stator disc comprises a plurality of pie-shaped laminated steel sections 43 separated by a material having a low magnetic permeance, such as aluminum or a reinforced phenolic resin. The number of sections 43 in each disc corresponds to the number of pie-shaped members 16, and the sections in each stator disc are aligned with members 16.

Rotor discs 50 and 52 are fastened to shaft 10 and positioned on each side of stator disc 38 to complete the first phase of the motor. Similarly, rotor discs 54 and 56 are positioned on each side of stator disc 40, and rotor discs 58 and 60 are positioned on each side of stator disc 42 to complete the second and third phases. Each rotor disc also has pie-shaped sections 61 of laminated steel surrounded by sections of low permeance material. In a three phase motor, the laminated sections of both the stator discs and the rotor discs have a peripheral width approximately corresponding to the width of members 16 and are surrounded on each side by twice this width of the lower permeance material.

A narrow groove is cut into the periphery of each rotor disc and this groove is filled with a high strength layer of fiberglass 62. Laminated sections 61 of the rotor discs in each phase are aligned with each other. Additionally, laminated sections of the rotor discs in the second phase are spaced peripherally by the width of a section from the laminated sections of the discs in the first phase, and the laminated sections of the rotor discs in the third phase are spaced in the same direction by the width of a laminated section from the corresponding sections of the discs in the second phase. Thus, when sections 61 of rotor discs 50 and 52 are aligned with sections 43 of stator disc 38, sections 61 of rotor discs 54 and 56 are aligned with imaginary sections of stator disc 40 adjacent its laminated sections, and sections 61 of rotor discs 58 and 60 are aligned with imaginary sections of stator disc 42 adjacent its laminated sections but located on the sides opposite the imaginary sections of disc 40. Long bolts pass through appropriate holes 64 in end plates 12 and 14 to clamp the parts of the motor together.

The magnetic flux paths are illustrated, respectively, by broken lines 70, 72, and 74. An interval of increasing magnetic permeance for these flux paths begins approximately at the time that the front edges of these laminated rotor sections 61 first begin to come into axial alignment with the stator sections 43 of the motor. In FIG. 1, in which clockwise rotation of the shaft 10 is assumed, the rotor sections 61 of the third phase are at the point at which the magnetic permeance is just beginning to increase as a result of the approaching alignment of the rotor sections 61 with the stator laminated sections 43. The permeance continues to increase until the laminated sections 61 of the rotor are in full alignment with the laminated sections 43 of the stator, at which point the permeance then begins to decrease. In order to produce positive motor torque, the controller circuitry of the invention must supply winding current during this interval of increasing magnetic permeance, and if motor braking is to be prevented, this winding current must be interrupted before the magnetic permeance begins to decrease as the rotor and stator laminated sections begin to move out of alignment. As was earlier stated, winding current during the interval of decreasing permeance produces negative torque and a braking action, which is undesirable except where a reduction in motor speed and/or a conversion of mechanical energy to electrical energy (regenerative braking) is considered advantageous.

In order to maximize the average torque developed by the motor while at the same time minimizing winding power losses and magnetic saturation losses to preserve efficiency, the motor winding ideally should be supplied with an ampere-turns waveform having the shape of a square wave. However, because of the finite rise and fall times associated with the build up and decline of winding ampere-turns, a trapezoidal waveform is the best that could be expected. Thus, in order to obtain maximum average torque at maximum efficiency, the instantaneous total winding ampere-turns should rapidly rise from zero to a maximum value at the beginning of the increasing permeance interval, should be maintained at this maximum value during this interval, and should rapidly be reduced to zero at the end of this interval. The ampere-turns should not again rise until the beginning of the next interval of increasing permeance.

Figures 2, 2A:
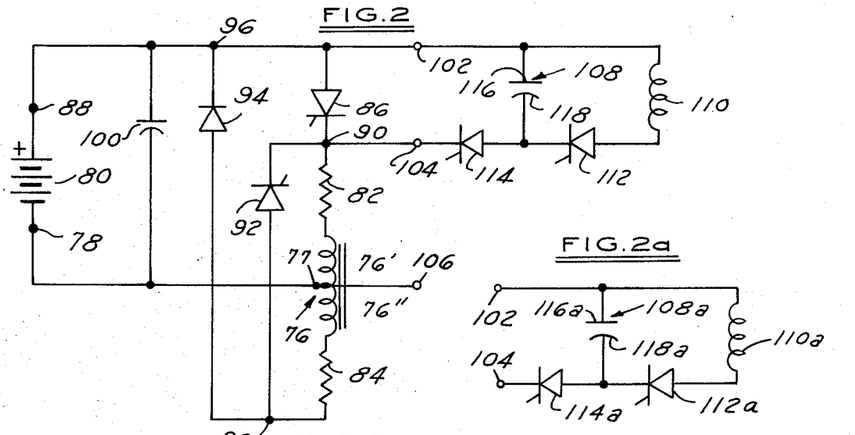
FIG. 2 is a schematic diagram of one embodiment for the controller circuit of the invention.
FIG. 2a is a schematic diagram of additional commutation circuitry which may be connected to terminals 102 and 104 of the FIG. 2 circuit.

The controller circuitry schematically illustrated in FIG. 2 may be used to supply motor winding ampere-turns having a waveform approximating the idealized trapezoidal shape. A winding 76 of a variable reluctance motor is connected at or about its midpoint 77 to the negative terminal 78 of a DC source of electrical energy in the form of a storage battery 80. The midpoint connection at 77 divides the motor winding 76 into a first portion 76' and a second portion 76''. The first portion 76' of the winding has an inherent electrical resistance 82, while the second portion 76'' has an inherent electrical resistance 84. If the variable reluctance motor has multiple phases, then winding 76 represents the winding of any one of those phases.

A primary solid state switching device, silicon-controlled rectifier (SCR) 86, has its anode connected to the positive terminal 88 of the storage battery 80 and its cathode connected at 90 to one end of the motor winding 76. A secondary solid state switching device, SCR 92, is connected in parallel with the motor winding 76 and in series with the primary solid state switching device 86. The cathode of the SCR 92 is connected to the cathode of the SCR 86. A rectifier 94 has its cathode connected at 96 to the positive terminal 88 of the storage battery 80 and has its anode connected at 98 to the other end of the motor winding 76. Also, because the current for motor operation is drawing in pulses from the storage battery 80, a filtering capacitor 100 may be connected as shown across the terminals of the battery.

The secondary solid state switching device, SCR 92, is shown connected across the entire winding 76. In practice, it may be connected across only a portion of the winding.

The circuit means shown in FIG. 2 to the right of terminals 102 and 104 are provided primarily for the purpose of commutating the primary SCR 86. The commutation circuit thus coupled to the primary SCR 86 and to the motor winding 76 includes a capacitor 108 connected in parallel with the series combination of an inductor 110 and an SCR 112. Connected between this parallel combination and terminal 104 is an SCR 114.

OPERATION

One of the functions of the logic circuitry (not shown) is to supply gating pulses for the various SCR's in the circuit of FIG. 2. The last pulse supplied by the logic circuitry during a period of increasing magnetic permeance may be applied to SCR 114 to place it in a conductive state. This produces a current from storage battery 80 through capacitor 108 and SCR 114 and through the first section 76' of the motor winding 76. Capacitor 108 thus becomes charged, plate 116 of the capacitor 108 being positive and approximately at twice the battery voltage. Subsequent to the build-up of charge on the capacitor 108, a gating pulse from the logic circuitry is applied to SCR 112 to render it conductive. When SCR 112 begins to conduct, conventional current flows out of the plate 116 of the capacitor 108, and because of the inductance 110, positive charge accumulates on the plate 118 of the capacitor 108. Thus, there is a charge reversal, plate 118 becoming positive with respect to plate 116. Due to the charge reversal, SCR 112 self-commutates.

As the laminated sections 61 of the variable reluctance motor rotor discs move toward alignment to begin another interval of increasing magnetic permeance, the self-inductance of the motor winding 76 begins to increase because of the increasing magnetic coupling. The application of ampere-turns to the motor winding during this interval produces positive torque. This is accomplished at the start by a gating pulse from the logic circuitry being applied to the gate terminal of SCR 86. Conventional current then flows out of the positive terminal of battery 80, through SCR 86 and into the first portion 76' of the motor winding, and then is returned to the negative terminal 78 of the battery. When the ampere-turns of the first portion 76' of the motor winding 76 have reached a predetermined level, a gating pulse from the logic circuitry is applied to SCR 114 to trigger it into a conductive state. Because plate 118 of the commutating capacitor 108 is positive with respect to plate 116, the SCR 86 is commutated and becomes nonconductive. Commutating capacitor 108 then discharges through SCR 114 and the first portion 76' of the motor winding, and also charges in the opposite direction so that plate 116 of capacitor 108 again becomes positive with respect to plate 118. As this occurs, the current through SCR 114 gradually declines and SCR 114 eventually self-commutates. A gating pulse is again applied to SCR 112 to reverse the polarity on the commutating capacitor 108 so that its plate 118 is again positive with respect to plate 116.

While the process just described for building up winding ampere-turns is particularly advantageous in the low speed section of the range of desired motor speed variation, it may, for the purpose of rapid current buildup in the winding, be preferable in the high speed section of the range to delete firing of the primary SCR 86 altogether and thus to rely for current buildup only on the capacitor discharge due to firing of SCR 114. Naturally, it is to be understood that before firing SCR 108 the capacitor charge has to be established such that plate 118 is positive with respect to plate 116, just as in the previously described case.

At or shortly after the time that SCR 114 is triggered, a gating pulse from the logic circuitry is applied to the secondary SCR 92. When a secondary SCR 92 becomes conductive, the motor winding 76 is essentially short-circuited so that the magnetic energy buildup in the first portion 76' of the motor winding spreads throughout the entire winding 76 and this results in a circulating, or "free-wheeling", current in the circuit loop formed by the motor winding 76 and the secondary SCR 92. Since these winding ampereturns are present during an interval of increasing magnetic permeance, positive torque is produced and magnetic energy is converted to mechanical energy. As time progresses, the circulating ampere-turns decline in magnitude. Then, the primary SCR 86 is again triggered by the logic circuitry. This permits the ampereturns in the first section 76' of the motor winding to again increase. SCR 114 may then be triggered once again to commutate primary SCR 86, and secondary SCR 92 may again be triggered to start another period of circulating current which again declines in magnitude.

It is also possible and sometimes useful for the purpose of reducing SCR switching power losses to omit the triggering of the primary SCR 86 and to rely only on the discharge current of the capacitor 108, initiated by triggering the SCR 114, to supply additional energy to the motor winding 76, thereby, increasing total winding ampere-turns.

The cyclical gating of the primary SCR 86, of the SCR 112 to reverse the polarity on the commutating capacitor 108, of the SCR 114 to commutate the primary SCR 86, and of the secondary SCR 92 to produce a curculating current over the entire motor winding 76 can be continued until just before the end of the interval of increasing magnetic permeance. At such time, it is desirable to remove the winding ampere-turns so that motor braking does not occur during the interval of decreasing magnetic permeance. This is accomplished by gating SCR 114 to commutate the primary SCR 86 without subsequently gating the secondary SCR 92. Thus, when SCR 114 is gated alone, current flows through the capacitor 108 to commutate the primary SCR 86 and to permit positive charge to accumulate on plate 116 of capacitor 108 until the current declines sufficiently to self-commutate SCR 114. When this occurs, the magnetic energy in the winding is permitted to return to the storage battery through the rectifier 94. Thus, efficient return of the magnetic energy in the motor winding to the storage battery 80 is achieved.

The sequence of events described above is repeated at the start of the next interval of increasing magnetic permeance. Also, if the variable reluctance motor employed has a plurality of phases as does the motor shown in FIG. 1, then separate controller circuitry identical to that shown in FIG. 2 would be utilized for each of the phases.

Yet another mode of operation, which is advantageous at intermediate and higher motor speed provided that the ratio of maximum to minimum self-inductance of motor winding 76 is 2½ or more, is described as follows: Capacitor 108 is charged by firing SCR 114 and the charge polarity is subsequently reversed by firing SCR 112 just as in the previous cases such that plate 118 is positive with respect to plate 116. At or shortly before the instant the self-inductance of motor winding 76' begins to rise, SCR 114 is again fired, discharging capacitor 108 through winding section 76' and building up current therein. The capacitor current reaches a peak and then declines thereby recharging capacitor 108 with reverse polarity such that plate 118 is negative with respect to plate 116. Shortly after the capacitor current has begun to decline, primary SCR 86 is fired and SCR 114 carrying the capacitor current is commutated off. If motor winding 76' has been designed to have the proper number of turns, the current through SCR 86, after having taken over all winding current from SCR 114, will at low motor speed rise only moderately until SCR 86 is commutated off by firing SCR 114, which has to be preceded by a charge reversal of capacitor 108, brought about by firing of SCR 112 during the interval in which SCR 86 is conducting. At high motor speeds the current through SCR 86 after having taken over all winding current from SCR 114 will, due to the increased counter electromotiveforce generated in the motor winding 76', not rise at all or will even decline before SCR 86 is commutated off by firing of SCR 114.

It is obvious that in this last-described operating mode the conduction interval of SCR 86 must always be larger than the time required to reverse the capacitor 108 charge polarity be firing SCR 112 and required to permit capacitor current flow through the inductor 100. This is a limitation which must be overcome if there is insufficient time for charge reversal due to too short a period of rising motor winding inductance at high motor speed.

The means to overcome this limitation is the addition of a second set of commutation circuit elements connected to terminals 102 and 104 as shown in FIG. 2a. The additional set consists of a second commutation capacitor 108a identical to the first capacitor 108, a second commutation SCR 114a identical to the first 114, a second charge reversal SCR 112a identical to 112 and a second inductor 110a identical to 110. For an operating mode in which the conduction time of SCR 86 is intended to be shorter than the required charge reversal time, the operation of the circuit of FIG. 2a is as follows. SCR's 114 and 114a are fired simultaneously to charge capacitors 108 and 108a to approximately twice the battery voltage. The charge polarities of both capacitors are subsequently reversed by firing SCR's 112 and 112a simultaneously. When or just before the motor winding 76' inductance begins to rise, one of the commutation SCR's is fired. It is now assumed that SCR 114 will be fired. Shortly after the current which is discharging capacitor 108 into motor winding 76' has begun to decline, SCR 86 is fired and takes over all current through winding 76' from SCR 114, thereby, commutating it off. Capacitor 108 is now charged with plate 118 negative versus plate 116. This polarity is reversed by firing SCR 112 immediately after SCR 114 has shut off. At the time that SCR 86 is to be turned off, SCR 114a is fired. This may be initiated while capacitor 108 is still undergoing charge reversal. The discharge of capacitor 108a causes the current through winding 76' to rise, SCR 86 to be back-biased and turned off. The winding current through 76' then reaches a peak, declines thereafter and induces a voltage in the portion 76'' of the motor winding causing the rectifier diode 94 to be forward biased into conduction.

At this point the current through the capacitor 108a diminishes rapidly to zero, turning off SCR 114a and leaving the capacitor 108a charged such that plate 118a is negative with respect to plate 116a. Immediately afterwards SCR 112a is fired to cause reversal of charge polarity of capacitor 108a. Now both capacitors 108 and 108a are properly charged for entering into a new cycle of energizing the motor winding 76' and 76''.

It should be noted that it is possible to shorten the conduction interval of SCR 86 to the point that it is no longer of any use to fire SCR 86 and make it take over motor winding current. Thus, if enough power can be furnished to the winding by two successive capacitor discharges the deletion of turn-on of SCR 86 would be in order and would eliminate all switching and conduction losses associated with SCR 86. It should be understood that the parallel commutation circuit of FIG. 2a can also be operated in synchronism with the commutation circuit of FIG. 2, in which case the operation of the motor and all other controller components is qualitatively identical to that previously described in connection with FIG. 2.

Figure 3:
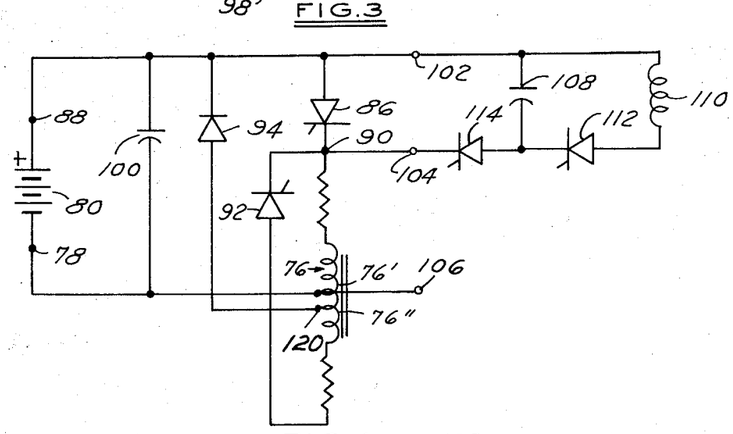
FIG. 3 is a schematic diagram of another embodiment of the controller circuit of the invention.

With reference now to FIG. 3, there is shown a circuit which is substantially similar to that shown in FIG. 2, except that anode of the rectifier 94 is connected at 120 to a point on the motor winding between its midpoint and the end of its second portion 76''. This variation affects the manner in which magnetic energy in the motor winding is returned through rectifier 94 to the storage battery 80 at the end of the interval of increasing magnetic permeance.

The circuit of FIG. 2 also may be modified by connecting the anode of secondary SCR 92 to a point located along the second portion 76'' of the motor winding 76 or at the midpoint 77 thereof, rather than at point 98 as shown in FIG. 2. With this modified connection, the circulating current spreads into an additional portion of the winding 76, but not into the entire winding, and is thus less advantageous in this respect than the FIG. 2 arrangement, but it nevertheless is a functional circuit within the scope of the invention. It has the advantage of reducing the blocking voltage which the SCR 92 must withstand, but the current levels encountered by it are correspondingly higher.

Figure 4:
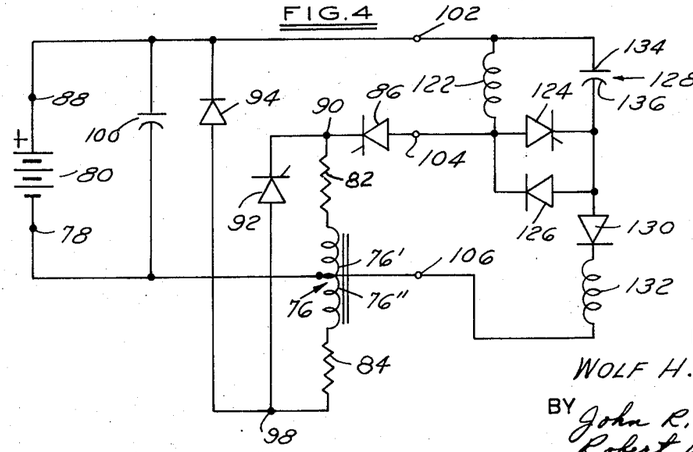
FIG. 4 is a schematic diagram of a controller circuit similar to that of FIG. 2 but including a different type of commutation circuit.

The circuit shown in FIG. 4 for a variable reluctance motor controller is substantially similar to the circuit of FIG. 2, but differs in that the anode of SCR 86 is connected to terminal 104, and in that the commutation circuitry connected to terminals 102, 104, and 106 in operation does not share one common current path with the load circuit of winding 76' and resistance 82. Its chief advantage over the previously described commutation circuits is that it is entirely independent of the load circuit, permitting commutation even if the load circuit impedance is predominantly resistive.

An inductor 122 is connected across the terminals 102 and 104. Also connected to terminal 104 is the anode of an SCR 124 and the cathode of a rectifier 126. A capacitor 128 has one of its terminals 134 connected to terminal 102, while its other terminal 136 is connected to the cathode of the SCR 124, to the anode of the rectifier 126, and to the anode of a rectifier 130. The rectifier 130 and an inductor 132 are connected to terminal 106 in a series arrangement with the elements described above. It should be noted that the anode of the primary SCR 86 is connected to the commutation circuit at terminal 104, rather than being connected directly to the positive terminal of the storage battery as it is in FIGS. 2 and 3.

The function of the commutation circuit of FIG. 4 is to commutate the SCR 86, which is connected through the commutation circuit to the DC source 80. Initially, the capacitor 128 accumulates a charge such that its upper terminal 134 is positive with respect to its bottom terminal 136, this accumulated charge being the result of charge flow from the battery source 80 and through the capacitor 128, the diode 130, and the inductor 132 to the negative terminal 78 of the battery. When the SCR 86 is gated, current flows through the inductor 122, the SCR 86, and the upper portion 76' of the motor winding 76 to the battery source 80. When it is desired to commutate the SCR 86, a gating pulse is applied to the SCR 124, which becomes conductive and forms a resonant LC circuit including as elements thereof the capacitor 128, the inductor 122, the SCR 124, and the rectifier 126. Charge then flows out of the terminal 134 of the capacitor 128, through the inductor 122 and the SCR 124 to the terminal 136 of the capacitor which then becomes positively charged with respect to the terminal 134. This charge is then free to return through the rectifier 126 and the inductor 122 to the terminal 134. However, the accumulation of positive charge on the terminal 136 commutates the SCR 124 so that when this charge returns to the terminal 134, further flow of charge is precluded. As soon as the commutating SCR 124 is fired, the current previously flowing through the inductor 124 and the SCR 86 to winding portion 76' is diverted, as a result of capacitor 128 discharge, from SCR 86 to flow through the SCR 124. It subsequently rises to a level determined by the initial voltage across the capacitor 128 and the impedance of the series resonant circuit consisting of the inductor 122 and the capacitor 128. In this process, the SCR 86 is reverse-biased and commutated off.

FIGS. 5 through 9 schematically illustrate additional commutation circuits which are coupled to the primary SCR 86 and to the motor winding 76 and which may be used for the purpose of commutating the primary SCR 86, these additional circuits individually replacing the commutation circuit illustrated in FIGS. 2 and 3. The circuits in FIGS. 5 through 9 are to be understood as being substituted for the various elements of the commutation circuit shown in FIGS. 2 and 3 to the right of the terminals 102, 104, and 106.

Figure 5:
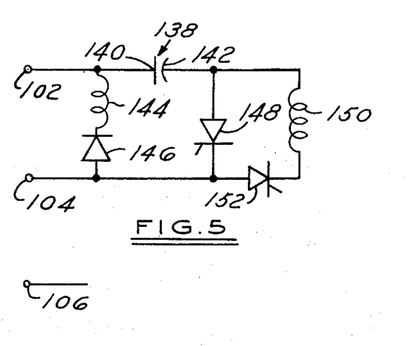
FIGS. 5 through 9 are schematic diagrams of various commutation circuits which may be used in conjunction with the embodiments shown in FIGS. 2 and 3.

The commutation circuit of FIG. 5 comprises a capacitor 138 having a terminal 140 and a terminal 142. Terminal 140 of the capacitor is connected to one terminal of an inductor 144 and to the terminal 102. The other terminal of the inductor 144 is connected to the cathode of a rectifier 146, the anode of this rectifier being connected to the terminal 104. Terminal 142 of the capacitor 138 is connected to the anode of an SCR 148 and to one terminal of a second inductor 150. The cathode of the SCR 148 is connected to the terminal 104 and to the anode of a second SCR 152, the cathode of the SCR 152 being connected to the other terminal of the inductor 150, thereby, to place this SCR and the inductor 150 in parallel with the SCR 148.

In the operation of this circuit, a gating pulse is applied to the SCR 148 to produce a current through the capacitor 138, the SCR 148, the upper portion 76' of the motor winding 76, and the battery source 80. After a positive charge has accumulated on the terminal 140 of the capacitor, the SCR 148 self-commutates. Gating pulses are then applied simultaneously to the SCRs 86 and 152, thereby, to form a resonant circuit including the capacitor 138, the SCR 86, the SCR 152, and the inductor 150. In terms of conventional current, the positive charge accumulated on the terminal 140 of the capacitor 138 flows through this circuit and accumulates on the opposite terminal, terminal 142, of the capacitor. This positive charge remains on terminal 142 because the SCR 152 becomes reverse-biased and self-commutates. When it is desired to commutate the primary SCR 86 (connected between the terminals 102 and 104), a gating pulse is applied to the SCR 148 once again. The accumulated positive charge on the terminal 142 of the capacitor flows through the SCR 148 and is applied to the cathode of the SCR 86 to reverse-bias it and cause it to commutate. This charge from the terminal 142 is then free to pass through the rectifier 146 and the inductor 144 back to the terminal 140 of the capacitor 138, terminal 140 thus reacquiring a positive charge. The FIG. 5 commutation circuit is advantageous, particularly during the capacitor charge reversal process, because of its high degree of independence from the motor winding load circuit and from the conduction period of the SCR 86.

Figure 6:
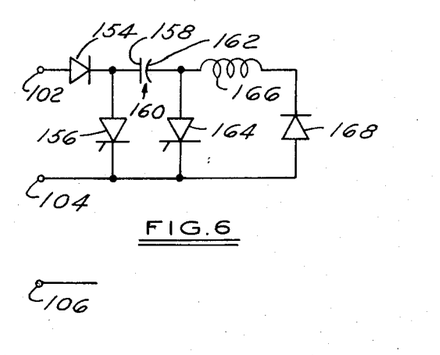

With reference now to the commutation circuit of FIG. 6, there is shown a rectifier 154 having its anode connected to the terminal 102 and having its cathode connected to the anode of an SCR 156 and to one terminal 158 of a capacitor 160. The other terminal 162 of the capacitor is connected to the anode of an SCR 164 and to one terminal of an inductor 166. The other terminal of the inductor is connected to the cathode of a rectifier 168. The anode of the rectifier 168 is connected to the cathode of the SCR 164 to place the series combination of the inductor 166 and the rectifier 168 in parallel with the SCR 164. The cathodes of the SCRs 156 and 164 are connected to the terminal 104.

To operate the circuit of FIG. 6, it is first necessary to accumulate a positive charge on the terminal 158 of the capacitor 160. This is done by the application of a gating pulse to the SCR 164 to produce a current from the battery source 80, through the rectifier 154, the capacitor 160, the SCR 164, the upper portion 76' of the motor winding 76, and thence back to the negative terminal 78 of the battery source. As the charge on the capacitor accumulates, the current decreases and the rectifier 154 and the SCR 164 self-commutate. Triggering of the SCR 156 then causes the conventional positive charge to flow through the resonant LC circuit including the SCR 156, the rectifier 168, the inductor 166, and the capacitor 160 so that terminal 162 thereof becomes positive with respect to the terminal 158. The presence of the rectifier 168 prevents oscillation of this charge, as it normally would in this LC circuit. SCR 156 and rectifier 168 self-commutate. The use of the rectifier 154 is necessary to prevent discharge of the capacitor 160, which initially becomes charged to a potential greater than that of the battery source 80, through the battery source. When it is desired to commutate the primary SCR 86, a gating pulse is again applied to the SCR 164. Because of the positive charge on the terminal 162 of the capacitor, this reverse-biases the SCR 86 and causes it to become nonconductive. The capacitor discharges through the upper portion of the motor winding as previously described and the terminal 158 of the capacitor again becomes positive with respect to the terminal 162 thereof. The advantages of the FIG. 6 commutation circuit are that very low current values in winding portion 76' can be maintained when desired and that the length of the conduction period of the primary SCR 86 can be allowed to become very small.

Figure 7:
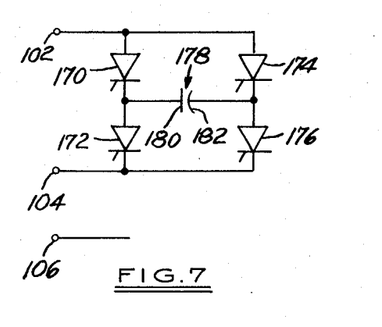

In the commutation circuit of FIG. 7, an SCR 170 is connected in series with an SCR 172. SCRs 170 and 172 are then connected in parallel with the series combination of an SCR 174 and an SCR 176. A capacitor 178 has one of its terminals 180 connected to the junction of the series connected SCRs 170 and 172 and has its other terminal 182 connected to the junction of the series connected SCRs 174 and 176. The anodes of the SCRs 170 and 174 are connected to the terminal 102, and the cathodes of the SCRs 172 and 176 are connected to the terminal 104. Of course, the primary SCR 86 is to be understood to be connected between the terminals 102 and 104.

In operation, either SCRs 170 and 176 or SCRs 172 and 174 are gated for the purpose of charging the capacitor 178 to a voltage sufficient for the commutation of the primary SCR 86. If SCRs 170 and 176 are gated, then charge flows from the battery source 80 through the SCR 170, the capacitor 178, the SCR 176, the upper portion 76' of the motor winding 76, to the negative terminal 78 of the battery source. As the capacitor 178 charges so that its terminal 180 acquires a positive charge with respect to its terminal 182, the current decreases and the SCRs 170 and 176 self-commutate. This prepares the commutation circuit, and the primary SCR 86 can then be triggered into conduction. When it is desired to commutate the primary SCR 86, gating pulses are applied to the SCRs 174 and 172. This reverse-biases the primary SCR 86 and commutates it, while charge continues to flow through SCR 174, capacitor 178, the SCR 172, and through the upper portion 76' of the motor winding 76 to the battery source. Thus, the terminal 182 of the capacitor 178 acquires a positive charge. When commutation of the primary SCR 86 is again required, it may be accomplished by the application of gating pulses to the SCRs 170 and 176.

It is also possible to operate the FIG. 7 circuit analogously to modes outlined in connection with FIG. 2 in which a capacitor discharge through motor winding 76' is made at or just before the beginning of rising winding inductance. In a mode advantageous at low motor speed, this discharge current may then be commutated off by firing the SCR 92 shortly after the discharge current had reached its peak. SCR 92 is subsequently commutated off by firing the appropriate pair of SCRs in the commutation circuit. In another mode suitable for medium and high motor speeds the primary SCR 86 is fired after a capacitor discharge current has been initiated and has begun to decline from its peak value. Subsequently SCR 86 is turned off by firing the appropriate pair of SCRs in the commutation circuit.

An obvious advantage of the circuit of FIG. 7 is that, for the purpose of rapidly building up motor winding current and subsequently commutating off either SCR 92 or 86, two capacitor discharge pulses are available in very short succession, since no waiting interval for a separate capacitor charge reversal process is required.

The circuit of FIG. 7, rather than being used for the purposes of commutation, can be used as a substitute for the primary solid state switching device, SCR 86. In this mode of operation, SCRs 170 and 176 may be gated alternately with SCRs 174 and 172. All of the power into the motor winding passes through the capacitor 178. Because the SCRs of FIG. 7 self-commutate, a separate commutation circuit is not required. This operating mode is particularly advantageous when a very steep current rise in the motor winding 76' is desired and the total duration of winding ampere-turns is to be limited to a single or two or three successive current pulses from capacitor 178. Also, the elimination of the primary solid state switching device eliminates the possibility of an excessive time rate of change of current during commutation of the primary SCR and the switching losses incurred by operation of SCR 86. This can result in a net advantage in spite of the fact that current passes through two SCRs and gives rise to losses therein before it enters the moor winding.

The circuit of FIG. 7, rather than being used for purposes of commutation, can be used as a substitute for the primary solid state switching device, SCR 86. In this mode of operation, SCRs 170 and 176 may be gated alternately with SCRs 174 and 172. All of the power into the motor winding passes through the capacitor 178. Because the SCRs of FIG. 7 self-commutate, a separate commutation circuit is not required. Also, the elimination of the primary solid state switching device eliminates the possibility of an excessive time rate of change of current during commutation of the primary SCR. However, the fact that current passes through two SCRs before it enters the motor winding contributes to the amount of electrical losses.

Figure 8:
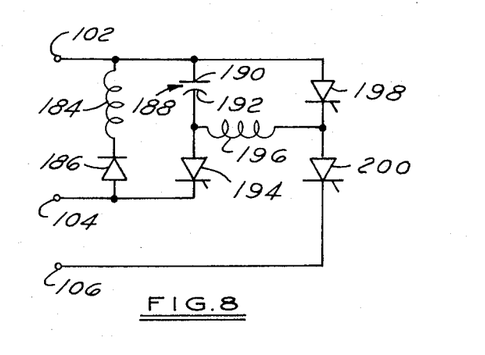

With reference now to the commutation circuit of FIG. 8, a first inductor 184 has one of its terminals connected to the terminal 102 and the other of its terminals connected to the cathode of a rectifier 186, the anode of the rectifier 186 being connected to the terminal 104. A capacitor 188 has a terminal 190 connected to the first inductor and to the terminal 102 and has its other terminal 192 connected to the anode of an SCR 194 and to one terminal of a second inductor 196. The cathode of the SCR 194 is connected to the anode of the rectifier 186 and to the terminal 104. The other terminal of the second inductor 196 is connected to the cathode of an SCR 198, the anode of which is connected to the terminal 102. The anode of an SCR 200 is connected to the junction formed by the second inductor 196 and the cathode of the SCR 198. The cathode of the SCR 200 is connected to the terminal 106.

In operating the FIG. 8 circuit for the purpose of commutating the primary SCR 86, it is first necessary to accumulate a positive charge on the terminal 190 of the capacitor 188. This is accomplished by applying a gating pulse to the SCR 200. Charge flows from the battery source 80, through the capacitor 188 and the SCR 200 until the capacitor is charged, and then the SCR 200 self-commutates. Capacitor charge reversal is accomplished by the application of a gating pulse to the SCR 198, which conducts current through the LC circuit formed by the inductor 196 and the capacitor 188 so that the terminal 192 of the capacitor becomes positively charged. When it is desired to commutate the primary SCR 86, a gating pulse is applied to the SCR 194. This applies the positive charge on the terminal 192 of the capacitor 188 to the cathode of the primary SCR 86 so that it is reverse-biased and commutates. Conventional current then flows out of the terminal 192 of the capacitor, through the SCR 194, through the rectifier 186, through the inductor 184, and back to the terminal 190 of the capacitor so that this terminal acquires a positive charge with respect to the terminal 192.

Figure 9:
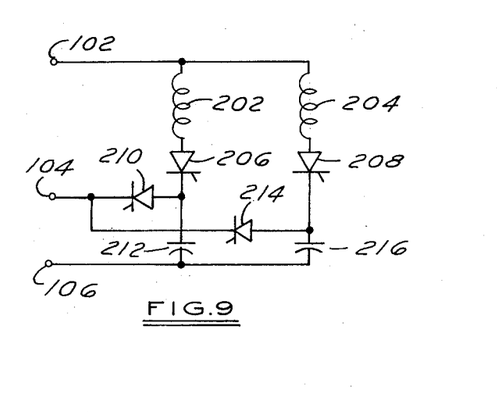

With reference now to the commutation circuit of FIG. 9, a first inductor 202 has one of its terminals connected to one of the terminals of a second inductor 204 and to the terminal 102. The first inductor 202 has its other terminal connected to the anode of an SCR 206, and the second inductor 204 has its other terminal connected to the anode of an SCR 208. The cathode of the SCR 206 is connected to the anode of an SCR 210 and to the upper terminal of a capacitor 212. Similarly, the cathode of the SCR 208 is connected to the anode of an SCR 214 and to the upper terminal of a capacitor 216. The lower terminals of the capacitors 212 and 216 are connected together and to the terminal 106. Similarly, the cathodes of the SCRs 210 and 214 are connected together and to the terminal 104. It may be seen that the circuit of FIG. 9 includes two sets of similar identically connected elements: the first set consisting of the inductor 202, the SCRs 206 and 210, and the capacitor 212; and the second set consisting of the inductor 204, the SCRs 208 and 214, and the capacitor 216.

Commutation of the primary SCR 86 can be effected through the use of only one of the two sets of elements described in the preceding paragraph. Thus, if the capacitor 212 is initially uncharged, a gating pulse may be applied to the SCR 206 to cause a current to flow from the battery through the SCR 206 and into the capacitor 212 so that its upper terminal becomes positive with respect to its lower terminal. The SCR 206 then self-commutates. The voltage on the capacitor 212 will be approximately twice that of the battery source 80. When it is desired to commutate the primary SCR 86, a gating pulse is applied to the SCR 210. This causes the positive charge on the capacitor 212 to flow through this SCR 210, through the upper portion 76' of the motor winding, and back to the lower terminal of the capacitor 212. This discharge occurs over a period of time sufficiently large so that the voltage at the terminal 104 remains above battery potential for a time interval great enough to effect commutation of the primary SCR 86. The application of a gating pulse once again to the SCR 206 charges the capacitor 212 to a potential nearly three times that of the battery source, the upper terminal of this capacitor again becoming positive with respect to the lower terminal.

Another way to operate the commutation circuit of FIG. 9, so that both sets of elements are used, is to apply gating pulses to both of the SCRs 206 and 208 so that the capacitors 212 and 216 are charged. The primary SCR 86 is then gated to produce current in the motor winding, and when it is desired to commutate this SCR, a gating pulse is applied to the SCR 210 as previously described. A gating pulse may then be applied to the secondary SCR 92 to produce circulating or free-wheeling operation. Meanwhile, the capacitor 212 will discharge, and the SCR 210 will self-commutate. The free-wheeling winding current may then be discontinued by the application of a gating pulse to the SCR 214, which causes charge to flow from the capacitor 216 and applies a reverse-bias to the secondary SCR 92 causing it to commutate.

The circuit of FIG. 9 may be used without employing the primary SCR 86 for initial buildup of motor winding current. In this mode of operation, gating pulses are applied to the SCRs 206 and 208, which subsequently self-commutate. This leaves the upper terminals of the capacitors 212 and 216 positively charged. A gating pulse applied to the SCR 210 then produces winding current. The SCR 210 is allowed to self-commutate after a gating pulse is applied to the free-wheeling secondary SCR 92. To commutate the free-wheeling secondary SCR 92, a gating pulse is applied to the SCR 214, which then self-commutates. When the SCR 92 is commutated, a current is produced in the rectifier 94 (FIGS. 2 and 3), thereby, returning electrical energy to the battery source 80. Analogously to modes of operation described for circuits of FIGS. 2, 2a and 7, one may choose to fire SCR 86 instead of 92 at medium and high motor speeds in order to increase motor power. Off-commutation of SCR 86 and return of winding energy through rectifier 94 to the battery is accomplished in a manner corresponding to the process outlined for SCR 92. The circuit of FIG. 9, just as the circuit of FIG. 2a but unlike all other circuits described here, permits the occurrence of discharge currents in close succession from two independently triggered commutation capacitor circuits. That means that neither SCR 86 nor SCR 92 have to be fired between successive capacitor discharge pulses through the motor winding, thus avoiding the possibility that the second pulse may be initiated before the current from the first pulse has declined to zero. In other words, SCR 210 when conducting may be commutated off by firing SCR 214 rather than permitting it to self-commutate by letting motor winding current fall to zero.

There are, of course, other modes of operation for the FIG. 9 circuitry.

Although the various solid state switching devices illustrated in the embodiments of FIGS. 2 through 9 have been stated to be, and described as, silicon-controlled rectifiers, it should be understood that other types of thyristors or three-terminal solid state devices, such as power transistors, triacs, and the like, may also be applicable.

In the application of the controller circuitry of the invention, it should be understood that the interval of time of increasing magnetic permeance decreases as motor speed increases. Therefore, as motor speed is increased, the time interval available for cyclical gating of the various solid state switching devices decreases and operates to limit the permissible number of cycles of winding ampere-turns that will produce positive torque.

Based upon the foregoing description of the invention, what is claimed and desired to be protected by Letters Patent is:

1. In relation to a variable reluctance motor having a winding that has a varying inductance during motor operation, a circuit for controlling the application of electrical energy to said winding, which comprises: a direct current source of electrical energy having a first terminal connected at about the midpoint of said winding and having a second terminal; circuit means connected to said second terminal of said source of electricalenergy and to said motor winding for applying electrical energy to a portion of said winding; and circuit means connected to said motor winding for causing said electrical energy in said portion of said winding to spread into an additional portion of said winding.

2. A circuit for the application of electrical energy to the winding of a variable reluctance motor in accordance with claim 1, which further includes circuit means connected to said winding and to said second terminal of said direct current source of electrical energy for returning electrical energy stored in said winding to said direct current source of electrical energy.

3. A circuit for the application of electrical energy to the winding of a variable reluctance motor in accordance with claim 1, wherein said circuit means for spreading the electrical energy in said portion of said winding into an additional portion of said winding comprises a solid state switching device connected in parallel with said winding, said winding being short-circuited when said solid state switching device is in a conductive state.

4. In relation to a variable reluctance motor having a winding that has a varying inductance during motor operation, a circuit for controlling the application of electrical energy to said winding, which comprises: a direct current source of electrical energy having a first terminal connected at about the midpoint of said winding and having a second terminal; a primary solid state switching device connected between said second terminal of said source of electrical energy and one end of said winding; a rectifier having first and second terminals, said second terminal of said rectifier being connected to said second terminal of said source of electrical energy and said first terminal of said rectifier being connected to said winding; and circuit means, coupled to said primary solid state switching device and to said winding, for commutating said primary solid state switching device.

5. A circuit for the application of electrical energy to the winding of a variable reluctance motor in accordance with claim 4, wherein said first terminal of said rectifier is connected to the other end of said winding.

6. A circuit for the application of electrical energy to the winding of a variable reluctance motor in accordance with claim 4, wherein said primary solid state switching device is a silicon-controller rectifier.

7. A circuit for the application of electrical energy to the winding of a variable reluctance motor in accordance with claim 4, wherein the connection of said primary solid state switching device to said second terminal of said direct current source of electrical energy is made through said circuit means for commutating said primary solid state switching device.

8. A circuit for the application of electrical energy to the winding of a variable reluctance motor in accordance with claim 4, wherein said circuit means for commutating said primary solid state switching device comprises: a capacitor having a first terminal connected to said second terminal of said source of electrical energy and having a second terminal; a first inductor having one of its terminals connected to said first terminal of said capacitor; a commutation circuit rectifier having its cathode connected to the other terminal of said first inductor and having its anode connected to the terminal of said primary solid state switching device connected to said one end of said winding; a first solid state switching device; a second inductor, one of the terminals of said second inductor being connected to one of the terminals of said first solid state switching device and being connected to said second terminal of said capacitor; a second solid state switching device having one of its terminals connected to another terminal of said first solid state switching device and to the anode of said commutation circuit rectifier, another terminal of said second solid state switching device being connected to the other terminal of said second inductor, said second solid state switching device and said second inductor thereby being connected in parallel with said first solid state switching device.

9. A circuit for the application of electrical energy to the winding of a variable reluctance motor in accordance with claim 4, wherein said circuit means for commutating said primary solid state switching device comprises: a first rectifier having its anode connected to said second terminal of said source of electrical energy; a first solid state switching device having one of its terminals connected to the cathode of said first rectifier; a capacitor having a first and second terminal, said first terminal being connected to the cathode of said first rectifier; a second solid state switching device having one of its terminals connected to said second terminal of said capacitor; an inductor having one of its terminals connected to said one terminal of said second solid state switching device and to said second terminal of said capacitor; and a second rectifier having its anode connected to other terminals of both said first and second solid state switching devices and having its cathode connected to the other terminal of said inductor, thereby, said second rectifier and said inductor being connected in series with one another and in parallel with said second solid state switching device; and said anode of said second rectifier and said other terminals of said first and second solid state switching devices together being connected to said one end of said winding.

10. A circuit for the application of electrical energy to the winding of a variable reluctance motor in accordance with claim 4, wherein said circuit means for commutating said primary solid state switching device comprises: a first solid state switching device having first and second terminals; a second solid state switching device having first and second terminals, said second terminal of said first solid state switching device being connected to said first terminal of said second solid state switching device to place said first and second switching devices in series with one another; a third solid state switching device having first and second terminals; a fourth solid state switching device having first and second terminals, said second terminal of said third solid state switching device being connected to said first terminal of said fourth solid state switching device to place said third and fourth switching devices in series with one another, said first terminals of said first and third solid state switching devices being connected together and to said second terminal of said source of electrical energy, and said second terminals of said second and fourth solid state switching devices being connected together and to said one end of said winding; and a capacitor having one of its terminals connected to the junction of said first and second solid state switching devices and having its other terminal connected to the junction of said third and fourth solid state switching devices.

11. A circuit for the application of electrical energy to the winding of a variable reluctance motor in accordance with claim 4, wherein said circuit means for commutating said primary solid state switching device comprises: a first inductor having one of its terminals connected to said second terminal of said source of electrical energy; a commutation circuit rectifier having its cathode connected to the other terminal of said first inductor, the anode of said commutation circuit rectifier being connected to said one end of said winding; a capacitor having first and second terminals, said first terminal being connected to said one terminal of said first inductor; a first solid state switching device having one of its terminals connected to said second terminal of said capacitor and having another terminal connected to the anode of said commutation circuit rectifier; a second inductor having one of its terminals connected to said second terminal of said capacitor; a second solid state switching device having one of its terminals connected to said first terminal of said capacitor and having another terminal connected to the other terminal of said second inductor; and a third solid state switching device having one of its terminals connected to said other terminals of said second inductor and said second solid state switching device, said third solid state switching device having another terminal connected to said winding at about the midpoint thereof and to said first terminal of said source of electrical energy.

12. A circuit for the application of electrical energy to the winding of a variable reluctance motor in accordance with claim 4, wherein said circuit means for commutating said primary solid state switching device comprises: a first inductor having one of its terminals connected to said second terminal of said source of electrical energy; a first solid state switching device having one of its terminals connected to said other terminal of said first inductor; a first capacitor having first and second terminals, said first terminal of said first capacitor being connected to another terminal of said first solid state switching device and said second terminal of said capacitor being connected to said winding at about the midpoint thereof and to said first terminal of said source of electrical energy; and a second solid state switching device having one of its terminals connected to said first terminal of said capacitor and to said other terminal of said first solid state switching device, another terminal of said second solid state switching device being connected to said one end of said winding.

13. A circuit for the application of electrical energy to the winding of a variable reluctance motor in accordance with claim 7, wherein said circuit means for commutating said primary solid state switching device comprises: a first inductor having one of its terminals connected to said second terminal of said source of electrical energy and the other terminal of said first inductor being connected to said primary solid state switching device; a first solid state switching device having one of its terminals connected to the junction of said primary solid state switching device with said other terminal of said first inductor; a first rectifier having its cathode connected to the junction of said primary solid state switching device with said other terminal of said first inductor, said first rectifier having its anode connected to another terminal of said first solid state switching device; a capacitor having first and second terminals, said first terminal being connected to said one terminal of said first inductor and said second terminal being connected to the anode of said first rectifier and to said other terminal of said first solid state switching device; a second rectifier having its anode connected to the junction of said second terminal of said capacitor with said other terminal of said first solid state switching device and with the anode of said first rectifier; and a second inductor having one of its terminals connected to the cathode of said second rectifier and having its other terminal connected to said winding at about its midpoint and to said first terminal of said source of electrical energy.

14. In relation to a variable reluctance motor having a winding that has a varying inductance during motor operation, a circuit for controlling the application of electrical energy to said winding, which comprises: a direct current source of electrical energy having a first terminal connected at about the midpoint of said winding and having a second terminal; a primary switching device connected between said second terminal of said source of electrical energy and one end of said winding, said primary switching device comprising a first solid state switching device having first and second terminals, said second terminal of said first solid state switching device being connected to said first terminal of said second solid state switching device to place said first and second switching devices in series with one another, a third solid state switching device having first and second terminals, a fourth solid state switching device having first and second terminals, said second terminal of said third solid state switching device being connected to said first terminal said fourth solid state switching device to place said third and fourth switching devices in series with one another, said first terminals of said first and third solid state switch-devices being connected together and to said second terminal of said source of electrical energy, and said second terminals of said second and fourth solid state switching devices being connected together and to said one end of said winding, and a capacitor having one of its terminals connected to the junction of said first and second solid state switching devices and having its other terminal connected to the junction of said third and fourth solid state switching devices; a secondary solid state switching device connected in parallel with at least a portion of said winding and in series with said primary switching device; and a rectifier having first and second terminals, said rectifier second terminal being connected to said second terminal of said source of electrical energy and said rectifier first terminal being connected to said winding.

15. In relation to a variable reluctance motor having a winding that has a varying inductance during motor operation, a circuit for controlling the application of electrical energy to said winding, which comprises: a direct current source of electrical energy having a first terminal connected at about the midpoint of said winding and having a second terminal; a primary solid state switching device connected between said second terminal of said source of electrical energy and one end of said winding; a secondary solid state switching device connected in parallel with at least a portion of said winding and in series with said primary solid state switching device; a rectifier having first and second terminals, said second terminal of said rectifier being connected to said second terminal of said source of electrical energy and said first terminal of said rectifier being connected to said winding; and circuit means, coupled to said primary solid state switching device and to said winding, for commutating said primary solid state switching device.

16. A circuit for the application of electrical energy to the winding of a variable reluctance motor in accordance with claim 15, wherein said first terminal of said rectifier is connected to the other end of said winding.

17. A circuit for the application of electrical energy to the winding of a variable reluctance motor in accordance with claim 15, wherein said primary and secondary solid state switching devices are silicon-controlled rectifiers.

18. A circuit for the application of electrical energy to the winding of a variable reluctance motor in accordance with claim 15, wherein the connection of said primary solid state switching device to said second terminal of said direct current source of electrical energy is made through said circuit means for commutating said primary solid state switching device.

19. A circuit for the application of electrical energy to the winding of a variable reluctance motor in accordance with claim 15, wherein said circuit means for commutating said primary solid state switching device comprises: a capacitor having a first terminal connected to said second terminal of said source of electrical energy and having a second terminal; a first inductor having one of its terminals connected to said first terminal of said capacitor; a commutation circuit rectifier having its cathode connected to the other terminal of said first inductor and having its anode connected to the terminal of said primary solid state switching device connected to said one end of said winding; a first solid state switching device; a second inductor, one of the terminals of said second inductor being connected to one of the terminals of said first solid state switching device and being connected to said second terminal of said capacitor; a second solid state switching device having one of its terminals connected to another terminal of said first solid state switching device and to the anode of said commutation circuit rectifier, another terminal of said second solid state switching device being connected to the other terminal of said second inductor, said second solid state switching device and said second inductor thereby being connected in parallel with said first solid state switching device.

20. A circuit for the application of electrical energy to the winding of a variable reluctance motor in accordance with claim 15, wherein said circuit means for commutating said primary solid state switching device comprises: a first rectifier having its anode connected to said second terminal of said source of electrical energy; a first solid state switching device having one of its terminals connected to the cathode of said first rectifier; a capacitor having a first and second terminal, said first terminal being connected to the cathode of said first rectifier; a second solid state switching device having one of its terminals connected to said second terminal of said capacitor; an inductor having one of its terminals connected to said one terminal of said second solid state switching device and to said second terminal of said capacitor; and a second rectifier having its anode connected to other terminals of both said first and second solid state switching devices and having its cathode connected to the other terminal of said inductor, thereby, said second rectifier and said inductor being connected in series with one another and in parallel with said second solid state switching device; and said anode of said second rectifier and said other terminals of said first and second solid state switching devices together being connected to said one end of said winding.

21. A circuit for the application of electrical energy to the winding of a variable reluctance motor in accordance with claim 15, wherein said circuit means for commutating said primary solid state switching device comprises: a first solid state switching device having first and second terminals; a second solid state switching device having first and second terminals, said second terminal of said first solid state switching device being connected to said first terminal of said second solid state switching device to place said first and second switching devices in series with one another; a third solid state switching device having first and second terminals; a fourth solid state switching device having first and second terminals, said second terminal of said third solid state switching device being connected to said first terminal of said fourth solid state switching device to place said third and fourth switching devices in series with one another, said first terminals of said first and third solid state switching devices being connected together and to said second terminal of said source of electrical energy, and said second terminals of said second and fourth solid state switching devices being connected together and to said one end of said winding; and a capacitor having one of its terminals connected to the junction of said first and second solid state switching devices and having its other terminal connected to the junction of said third and fourth solid state switching devices.

22. A circuit for the application of electrical energy to the winding of a variable reluctance motor in accordance with claim 15, wherein said circuit means for commutating said primary solid state switching device comprises: a first inductor having one of its terminals connected to said second terminal of said source of electricalenergy; a commutation circuit rectifier having its cathode connected to the other terminal of said first inductor, the anode of said commutation circuit rectifier being connected to said one end of said winding; a capacitor having first and second terminals, said first terminal being connected to said one terminal of said first inductor; a first solid state switching device having one of its terminals connected to said second terminal of said capacitor and having another terminal connected to the anode of said commutation circuit rectifier; a second inductor having one of its terminals connected to said second terminal of said capacitor; a second solid state switching device having one of its terminals connected to said first terminal of said capacitor and having another terminal connected to the other terminal of said inductor; and a third solid state switching device having one of its terminals connected to said other terminals of said second inductor and said second solid state switching device, said third solid state switching device having another terminal connected to said winding at about the midpoint thereof and to said first terminal of said source of electrical energy.

23. A circuit for the application of electrical energy to the winding of a variable reluctance motor in accordance with claim 15, wherein said circuit means for commutating said primary solid state switching device comprises: a first inductor having one of its terminals connected to said second terminal of said source of electrical energy; a first solid state switching device having one of its terminals connected to said other terminal of said first inductor; a first capacitor having first and second terminals, said first terminal of said capacitor being connected to another terminal of said first solid state switching device and said second terminal of said capacitor being connected to said winding at about the midpoint thereof and to said first terminal of said source of electrical energy; and a second solid state switching device having one of its terminals connected to said first terminal of said capacitor and to said other terminal of said first solid state switching device, another terminal of said second solid state switching device being connected to said one end of said winding.

24. A circuit for the application of electrical energy to the winding of a variable reluctance motor in accordance with claim 18, wherein said circuit means for commutating said primary solid state switching device comprises: a first inductor having one of its terminals connected to said second terminal of saidsource of electrical energy and the other terminal of said first inductor being connected to said primary solid state switching device; a first solid state switching device having one of its terminals connected to the junction of said primary solid state switching device with said other terminal of said first inductor; a first rectifier having its cathode connected to the junction of said primary solid state switching device with said other terminal of said first inductor, said first rectifier having its anode connected to another terminal of said first solid state switching device; a capacitor having first and second terminals, said first terminal being connected to said one terminal of said first inductor and said second terminal being connected to the anode of said first rectifier and to said other terminal of said first solid state switching device; a second rectifier having its anode connected to the junction of said second terminal of said capacitor with said other terminal of said first solid state switching device and with the anode of said first rectifier; and an inductor having one of its terminals connected to the cathode of said second rectifier and having its other terminal connected to said winding at about its midpoint and to said first terminal of said source of electrical energy.

25. A circuit for the application of electrical energy to the winding of a variable reluctance motor in accordance with claim 23, which further includes means for commutating said secondary solid state switching device comprising: a second inductor having one of its terminals connected to said one terminal of said first inductor; a third solid state switching device having one of its terminals connected to the other terminal of said second inductor; a second capacitor having first and second terminals, said first terminal of said second capacitor being connected to another terminal of said third solid state switching device and said second terminal of said second capacitor being connected to said second terminal of said first capacitor; and a fourth solid state switching device having one of its terminals connected to said first terminal of said second capacitor and to said other terminal of said third solid state switching device, and said fourth solid state switching device having another terminal connected to said other terminal of said second solid state switching device and to said one end of said winding.

26. A process for applying electrical energy from a source thereof to the winding of a variable reluctance motor, which comprises the steps of: switching a first portion of said winding into electrically conductive circuit with said source of electrical energy to produce current in said first portion of said winding; short-circuiting said first portion, and an additional portion, of said winding to spread current into said additional portion of said winding; and switching said first portion of said winding out of electrically conductive circuit with said source of electrical energy.

27. A process for applying electrical energy to a variable reluctance motor winding in accordance with claim 26, which further includes the steps of: discontinuing said short-circuiting of said motor winding; and again switching said first portion of said winding into electrically conductive circuit with said source of electrical energy.

28. A process for applying electrical energy to a variable reluctance motor winding in accordance with claim 27, which further comprises the steps of: once again switching said first portion of said winding out of electrically conductive circuit with said source of electrical energy; and returning magnetic energy stored in said winding to said source of electrical energy.

* * * * *